March 18, 1958  F. E. SMITH  2,827,158
VIBRATORY PARTS FEEDER

Filed Oct. 25, 1954  2 Sheets-Sheet 1

INVENTOR.
FLOYD EDWARD SMITH
BY
Charles L. Lovenbeck
Attorney

March 18, 1958 F. E. SMITH 2,827,158
VIBRATORY PARTS FEEDER
Filed Oct. 25, 1954 2 Sheets-Sheet 2
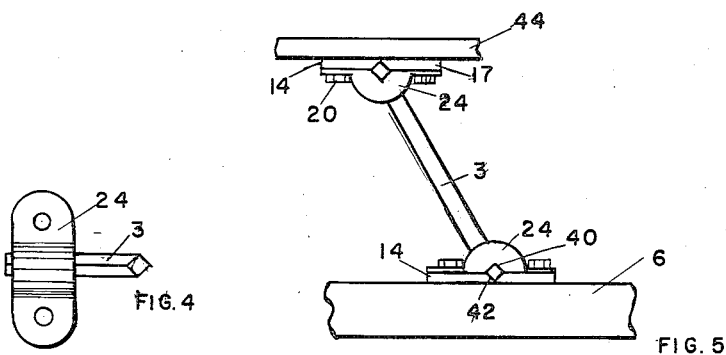
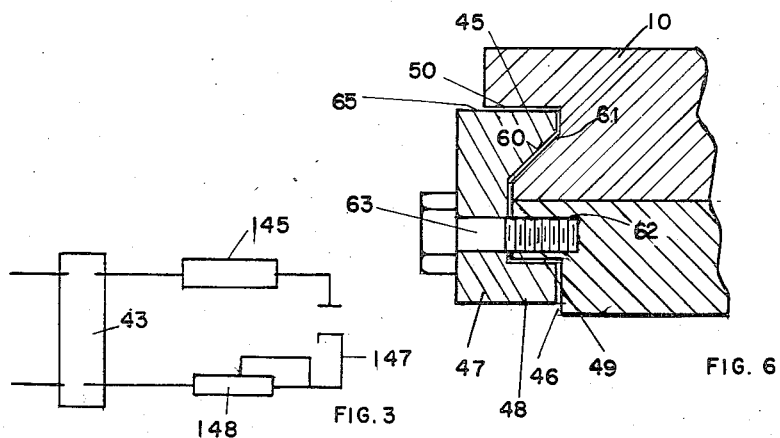
INVENTOR.
FLOYD EDWARD SMITH
BY
Charles L. Lovercheck
Attorney United States Patent Office 2,827,158
Patented Mar. 18, 1958

2,827,158

VIBRATORY PARTS FEEDER

Floyd Edward Smith, Erie, Pa.

Application October 25, 1954, Serial No. 464,320

7 Claims. (Cl. 198—220)

This invention relates to sorting machines and more particularly to the vibratory type of sorting machine for a large number of articles of manufacture wherein the articles are dressed into position preparatory to a manufacturing operation.

This application constitutes a continuation in part of my application, Serial No. 371,983, filed August 3, 1953, and constitutes an improvement thereover in that in the present machine, the shape of the springs supporting the hopper is such that they will not slip from their clamped position on the hopper, even though they are not clamped tightly, and the hopper itself may be adjusted to a position to give optimum feeding from a given vibration, amplitude, and frequency. Further, various styles and designs of hoppers can be used on the same base.

It is, accordingly, an object of this invention to overcome certain disadvantages in previous sorting machines and, more particularly, an object of this invention is to provide a novel type of suspension for sorting machines and a novel type of hopper therefor which are economical to manufacture, simple in construction, and simple to use.

Another object of the invention is to provide a novel type of spring for supporting a vibratory sorting machine.

A further object of this invention is to provide a sorting machine having spring supports thereto which utilize both a torsional and a bending effect in the spring itself and wherein the springs are adapted to be positively clamped to the hopper and to the base.

A still further object of the invention is to provide a novel combination of sorting machine with an adjustable and interchangeable hopper thereon.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is a wiring diagram for operating the solenoid of the sorting machine;

Fig. 4 is a top view of the connecting means for connecting the spring supports to the base in the invention;

Fig. 5 is a side view of the connecting means shown in Fig. 4; and

Fig. 6 is an enlarged cross sectional view of the clamping means for clamping the hopper to the base.

Figure 1:
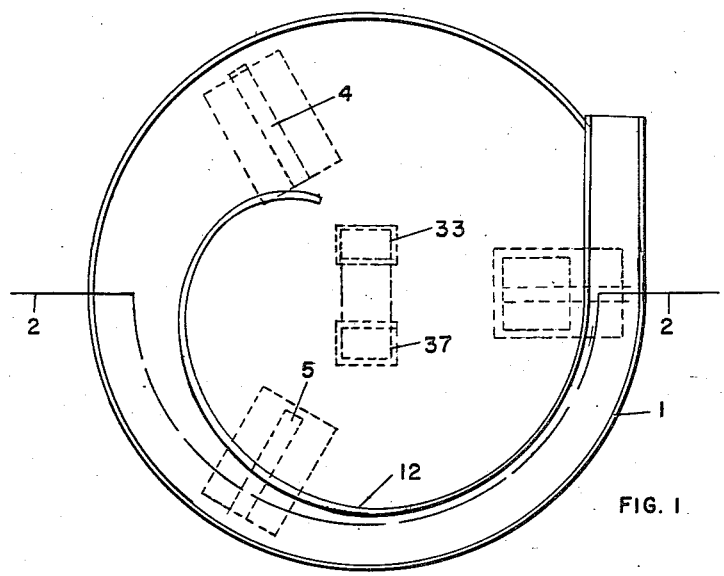
Fig. 1 is a top view of a sorting machine according to the invention.
Figure 2:
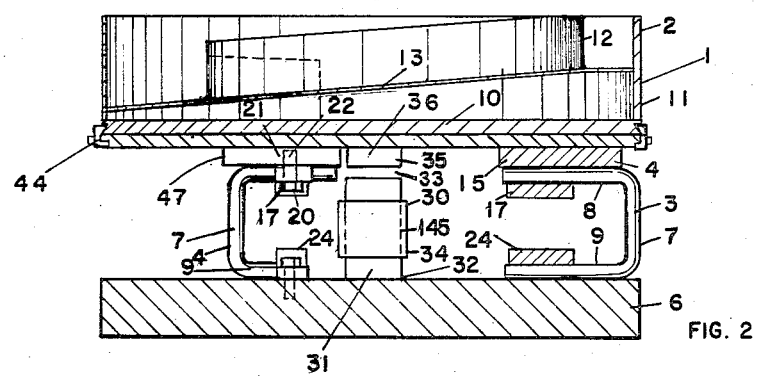
Fig. 2 is a cross sectional view taken on line 2—2 of Fig. 1.

Now with more specific reference to the drawings, in Figs. 1 and 2, a vibratory machine 1 is shown having a hopper 2. The hopper 2 is supported by spring members 3, 4, and 5 on a base 6. The springs 3, 4, and 5 are U-shaped having the intermediate portion 7 and the end portions 8 and 9. The springs 3, 4, and 5 are non-circular in cross section as shown in Figs. 4 and 5 and they are received in complementary perpendicular non-circular seats 40 in block members 24. A plate 14 may be disposed between the blocks 24 and the base 6 and between the blocks 24 and the plate 44. The plates 14 have a non-circular opening 42 to accommodate the lower portion of the non-circular spring members 3, 4, and 5.

The hopper 2 is made up of the bottom 10 and the cylindrical upstandnig side portion 11 which contains a trough or track 12 which is spiral in shape when viewed from above the bottom 10 thereof and which is also inclined upwardly in a helical path. The hopper 2 may be provided with the required number of baffles and troughs for the particular requirement of the individual job or the trough 12 could be extended in a multiplicity of turns being of greater angle to the base 6 and of the form of a conveyor.

The bottom 10 of the hopper 2 is supported on the plate 44. The bottom 10 of the hopper 2 has the peripheral groove 45 therein and the lower edge of the plate 44 has the groove 46 therein. Spaced clamps 47 have a lower flange 48 which engages the groove 46 and engages the downwardly facing face 49 thereof. A clearance is provided between the upper surface 65 of the clamping member 47 and the lower surface 50 of the bottom 10 so that the inclined surface 60 will slide upward on the surface 61 of the bottom 10 when the bolt 63 is tightened. The bolt 63 threadably engages the threaded hole 62 in the plate 44.

The plates 14 are secured to the plate 44 and the bottom turn of the hopper 2 rests on the plate 44 and the blocks 24 serve to hold one end 8 of the spring members 3, 4, and 5 to the bottom of the vibratory hopper 2. The blocks 24 and plates 14 have openings which are generally shaped to surround one end 8 of the spring members 3, 4, and 5 and to clamp the end 8 rigidly to the plates 44 and base 6. The blocks 24 and plates 14 comprise a bracket 17 which is held thereto by means of bolts 20 which pass through holes 21 in the brackets 17 and threadably engage the plates 14 at 22. In like manner, the brackets 17 surround the end 9 of the spring members 3, 4, and 5 and hold them against movement and rotation relative to the base 6 in cooperation with the plates 14. The hopper 2 may be supported on three or more spring supports 3, 4, and 5 and it will be apparent that when the hopper 2 is moved toward the base 6, the ends of the spring members 3, 4, and 5 may be twisted; that is, the intermediate part 7 will be subjected to bending and a torsional reaction will result in the ends 8 and 9. In this manner, the hopper 2 will be moved toward the base 6 axially and, at the same time, it will be rotated.

It will be apparent that this oscillatory and rotative movement of the hopper 2 is very rapid, that the parts or articles held therein will be thrown toward the outer edge of the hopper member 2 into the trough 12, and that they will move upward along the inclined path 13; that is, the hopper 2 will move down and backward from each article. Then, as the article drops down to meet it, the hopper 2 will move up and forward, moving the article, and then drop out from under the article, move backward again, pick the article up again, and move it forward.

The hopper 2 may be operated by mechanical means; however, it may be operated by means of a solenoid excited by rectified A. C. on the circuit shown in Fig. 3 which is similar to that shown in Patent Number 1,918,456 or the circuit may be simplified to a simple rectified circuit to supply pulsating A. C. to the solenoid 145 as shown in Fig. 3.

The solenoid 145 for operating the sorting device has a main frame 31 attached to the base 6 at 32 by welding or brazing and the frame 31 extends upwardly at 33 to form an armature 35 for the solenoid 34. The solenoid 34 reacts on the movable armature 35 which is attached to the bottom 10 of the hopper 2 at 36 to be moved therewith. It will be apparent that when the solenoid 34 of the solenoid 145 is excited, a magnetic field will be set up so that lines of magnetic force flow through the parts 37 and 33 of the armature 35 and through the armature 35, tending to pull the armature 35 downward to the solenoid 145, thus pulling the hopper 2 downward against the force of the springs 3, 4, and 5. It will be apparent that the frequency of movement of the solenoid 145 will be exactly equal to the frequency of the line A. C. which is attached to the plate 44 to meet therewith. This should be the natural frequency of the springs 3, 4, and 5.

In Fig. 3, a rectifier circuit for exciting the solenoid 145 is shown made up of the transformer 43 which supplies current through the adjustable resistance element 148 and is rectified by the tube 147 and from there flows through the solenoid 145.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A sorting device comprising a cylindrical hopper having a helical trough disposed therein, said hopper being supported on springs, said springs being U-shaped, one end of said U-shaped springs attached to said hopper and the other end thereof attached to a base, the ends of said springs being disposed generally radially of said hopper, and a solenoid fixed to said base and having an armature attached to said hopper and adapted to be actuated by a pulsating electrical current whereby said device is vibrated, the ends of said springs being non-circular in cross section, and a complementary shaped bracket surrounding and clamping said ends to said hopper.

2. A sorting device comprising a cylindrical hopper having a helical trough disposed therein, said hopper being supported on springs, said springs being U-shaped, one end of said U-shaped springs being attached to said hopper and the other end thereof being attached to a base, the ends of said springs being disposed generally radially of said hopper, a solenoid fixed to said base and having an armature attached to said hopper and adapted to be actuated by a pulsating electrical current whereby said device is vibrated, the ends of said springs being non-circular in cross section, and brackets having non-circular openings therein attached to said base and to said hopper receiving said ends.

3. A sorting device comprising a cylindrical hopper having a helical trough disposed therein, said hopper being supported on springs, said springs being U-shaped and one end of each said U-shaped spring attached to said hopper and the other end thereof attached to a base, the ends of said springs being disposed generally radially of said hopper, a solenoid fixed to said base and having an armature attached to said hopper and adapted to be actuated by a pulsating electrical current whereby said device is vibrated, and means on said hopper to attach said hopper to said springs, said means on said hopper to attach said hopper to said springs comprising a clamping device whereby said hopper may be attached to said springs and adjustably rotated relative to said base to adjust said hopper for optimum vibration characteristics.

4. The sorting device recited in claim 3 wherein said clamping device comprises a downwardly and outwardly disposed surface on the peripheral edge of said hopper, a downwardly facing edge on a member having a relatively flat surface, a clamping member having an upwardly facing surface adapted to engage said downwardly facing surface, an upwardly and inwardly facing surface on said clamping member adapted to engage said downwardly and outwardly facing surface, and means to force said clamping member toward said hopper and said member whereby said clamping member forces said hopper into clamped engagement with said member.

5. A sorting device comprising a base, means to support a hopper, said means to support a hopper being spaced from said base, means attached to said base and to said means to support a hopper resiliently supporting said means to support a hopper for vibration thereof in a helical path relative to said base, actuating means connected to said hopper supporting means, means to apply an intermittent electrical current to said actuating means to vibrate said means to support a hopper relative to said base, a cylindrical hopper supported on said means to support a hopper, said hopper having a helical track disposed therein and extending from the bottom thereof upwardly toward the top around the inner periphery thereof, said track comprising an inclined path terminating at its upper end at one side of said hopper, and means engaging the outer peripheral edge of said hopper and engaging said means to support a hopper to selectively clamp said hopper to said means to support a hopper in any of a plurality of positions whereby said hopper may be unclamped and rotated to a position on said means to support a hopper to relocate said upper end of said hopper.

6. The device recited in claim 5 wherein said clamping means comprises radially disposed bolts threadably engaging said means to support a hopper.

7. A sorting device comprising a cylindrical hopper having a helical track disposed around the inner periphery thereof, a support for said hopper, a base, resilient means, said hopper being supported on said support in spaced relation on said base by said resilient means, one end of said resilient means being attached to said base and the other to said support, actuating means for applying an intermittent pulsating force to said hopper whereby said hopper and said support are vibrated in a helical path relative to said base, and means for attaching said hopper to said support, said attaching means comprising circumferentially spaced clamping members on said support engaging the outer peripheral edge of said hopper, said clamping members being releasable to allow said hopper to be rotated on said support to any position on said support whereby the position of the outlet from said track relative to said base can be changed.

References Cited in the file of this patent

UNITED STATES PATENTS

| | | |
|---|---|---|
| 1,497,603 | Stebbins | June 10, 1924 |
| 1,920,672 | Andersen | Aug. 1, 1933 |
| 2,654,466 | Spurlin | Oct. 6, 1953 |

FOREIGN PATENTS

| | | |
|---|---|---|
| 142,508 | Australia | July 27, 1951 |